United States Patent [19]
Suzuki

[11] Patent Number: 5,393,476
[45] Date of Patent: Feb. 28, 1995

[54] METHOD FOR PRODUCING CELLULOSE ESTER FILM

[75] Inventor: Yuji Suzuki, Kanagawa, Japan

[73] Assignee: Fuji Photo Film Co., Ltd., Kanagawa, Japan

[21] Appl. No.: 953,226

[22] Filed: Sep. 30, 1992

[30] Foreign Application Priority Data

Sep. 30, 1991 [JP] Japan .................................. 3-276402

[51] Int. Cl.$^6$ ............................................. B29C 41/28
[52] U.S. Cl. ..................................... 264/169; 264/39; 264/217; 425/224; 425/225
[58] Field of Search ............... 264/39, 169, 216, 217, 264/170, 212, 177.11, 177.18, 218; 118/413; 425/224, 225

[56] References Cited

U.S. PATENT DOCUMENTS

| | | | |
|---|---|---|---|
| 2,051,201 | 8/1936 | Davidson | 264/169 |
| 2,221,019 | 11/1940 | Clarke | 264/169 |
| 2,249,507 | 7/1941 | Van Derhoef | 425/225 |
| 2,369,484 | 2/1945 | Nadeau | 425/224 |
| 3,032,817 | 5/1962 | Czerkas | 264/169 |
| 3,112,528 | 12/1963 | Czerkas | 264/169 |
| 3,502,757 | 3/1970 | Spencer | 264/169 |

FOREIGN PATENT DOCUMENTS

2-208650 8/1990 Japan .

*Primary Examiner*—Mathieu D. Vargot
*Attorney, Agent, or Firm*—Sughrue, Mion, Zinn, Macpeak & Seas

[57] ABSTRACT

A method for producing a film or sheet of a cellulose ester such as cellulose triacetate (TAC), cellulose diacetate, or the like, in which a film-forming solution is extruded through the slot of an extrusion die onto a support while a liquid is dropped at opposite ends of the die onto the flow of the film-forming solution emerging from the slot, thereby to prevent slugging of the solution, wherein a solvent contained in the dropping liquid contains a poor solvent for a solute in the film-forming solution in an amount in a range of from 30% to 90% by weight relative to a good solvent for the solute contained in the dropping liquid. With the invention, slugging is prevented and production efficiency improved without adversely affecting the formed film, without problems in separating the film from the support due to insufficient drying, and without requiring periodic cleaning of the support or reduction of the film production rate.

7 Claims, 2 Drawing Sheets

METHOD FOR PRODUCING CELLULOSE ESTER FILM

BACKGROUND OF THE INVENTION

The present invention relates to a film producing method used to produce a film or sheet of a cellulose ester such as cellulose triacetate (TAC), cellulose diacetate, or the like.

In a conventional method for producing such a film, a film-forming solution is prepared by dissolving a cellulose ester such as cellulose triacetate, cellulose diacetate, or the like, to which is added a small quantity of plasticizer, in an organic solvent containing methylene chloride as a main component. As shown in FIG. 4, the film-forming solution is made to flow over a polished metal support 3 by passing the film-forming solution through a slot 2 of an extrusion die 1.

In this process, however, a slug 5 of cellulose acetate tends to format the lip 4 of the outlet slot 2 of the die 1 at the two end portions of the slot 2 due to evaporation of the solvent contained in the film-forming solution after the process has been carried out for a long period. This is termed "slugging". When such slug 5 grows, there has been a problem in that the slug 5 interferes with the flow of the film-forming solution emerging from the outlet slot 2, thereby resulting in the formation of a film 17 having uneven edge portions 6. Also, sometimes the slug 5 separates from the lip 4, allowing the separated slug 5 to damage the film, for example, when the separated slug 5 adheres to a feed roller in a subsequent stage.

In order to prevent such slugging from occurring, a method in which a gas mixture of an evaporated solvent and air is sprayed in the vicinity of the opposite ends of the slot of the extrusion die has been used. A method is also known in which a solvent is dropped onto the film-forming solution, for example, at a flow rate 0.3 to 5 cc/min, at the opposite end portions of the extrusion slot. Such methods are disclosed, for example, in U.S. Pat. No. 3,112,528 and Japanese Patent Unexamined Publication No. Hei. 2-208650.

In the former method in which a gas mixture is sprayed, however, the flow of the gas can sometimes cause an unevenness in thickness of the formed film. In the latter method, although slugging can be prevented, the concentration of the solvent in the base becomes high, as a result of which the drying of the film on the support becomes slow at portions (base end portions) where the solvent is dropped onto the film-forming solution because the film absorbs the dropped liquid. As a result, incomplete separation of the film from the support occurs. To overcome this difficulty, it has been required to periodically clean the support or reduce the rate of film formation so as to increase the drying time on the support. Such measures though have a disadvantage in that they inevitably result in a lowered production efficiency.

SUMMARY OF THE INVENTION

It is therefore an object of the present invention to overcome the foregoing problems in the prior art.

It is another object of the present invention to provide a film producing method in which slugging is prevented from occurring and the production efficiency is improved without adversely affecting the formed film, without problems related to incomplete separation due to insufficient drying, and without requiring periodic cleaning of the support or requiring reduction of the film forming rate.

The foregoing and other objects of the present invention have been attained by a film producing method in which a liquid is dropped at the opposite ends of the slot of an extrusion die onto the flow of a film-forming solution extruded from the extrusion die thereby to prevent slugging of the solution from occurring, wherein the dropping liquid contains a poor solvent for the solute in the film-forming solution in an amount in a range of from 30% to 90% by weight (inclusive) relative to a good solvent for the solute.

According to the present invention, with respect to the poor solvent for the solute contained in the film-forming solution relative to the good solvent for the solute, a good solvent for cellulose triacetate or cellulose diacetate may be methylene chloride, while as the poor solvent for the solute, methanol, butanol, acetone, or the like may be used.

According to the present invention, as the liquid to be dropped at the end portions of the flow of the film-forming solution, a solvent mixture of good and poor solvents for the solute contained in the film-forming solution is used, and the ratio of the poor solvent to the good solvent for the solute is selected to be a value in a range of from 30% by weight to 90% by weight (both inclusive), preferably, in a range of from 40% by weight to 90% by weight (both inclusive), and more preferably, in a range of from 60% by weight to 90% by weight (both inclusive).

Further, the liquid to be dropped is not limited to a solvent mixture of poor and good solvents containing no solid portion, but any solution containing the same solvent as that in the film-forming solution may be used as long as the solvent composition of the solution is within the foregoing range. In such a case, however, it is necessary that the solute concentration in the solution be lower than that in the film-forming solution, and it is desirable that the solute concentration be not greater than 10% by weight.

It is further desirable that the liquid dropping position be within a hatched area shown in FIG. 1, that is, a range 16 defined by a distance b=20 mm from the boundary of the die body and a side plate toward the inside of the slot width and a distance a=10 mm from a slot blade lip portion to a blade outer wall portion.

The reason why the ratio of the poor solvent is selected to be not smaller than 30% by weight is as follows. The portions (base end portions) on which the liquid is dropped absorb the dropped liquid containing the poor solvent at a high rate so that the amount of solvent contained in the base is high. Accordingly, the base end portion gels (solidifies) during the drying process on the support so that the separation property of the formed film is improved.

The reason why the ratio of mixture of the poor solvent is selected to be not larger than 90% by weight is that if the ratio of the poor solvent is too large, the film portion on which the liquid is dropped tends to gel in such a manner that film formation becomes unstable. FIG. 3 shows such an unstable state.

DESCRIPTION OF THE PREFERRED EMBODIMENTS

The present invention will be described in detail with reference to specific examples thereof.

Figure 1:
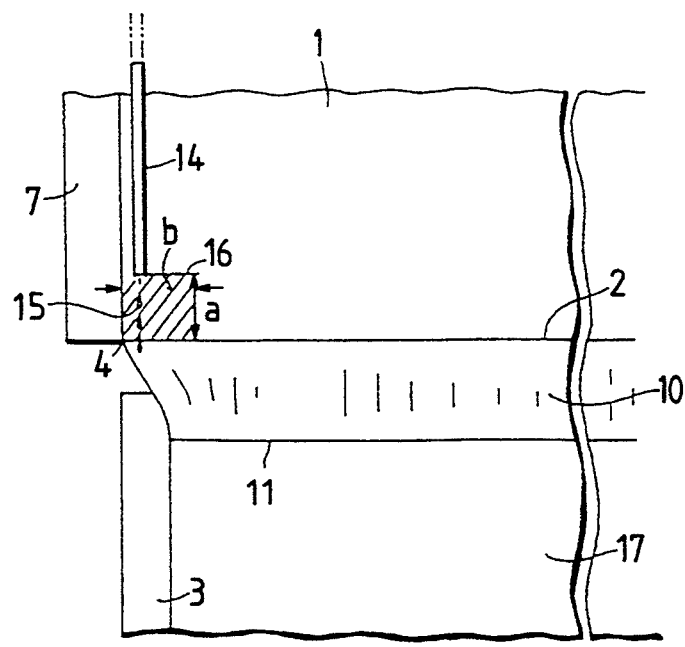
FIG. 1 is a partially enlarged perspective view of an apparatus for producing a film illustrating a method for forming a film using an extrusion die according to the present invention.
Figure 2:
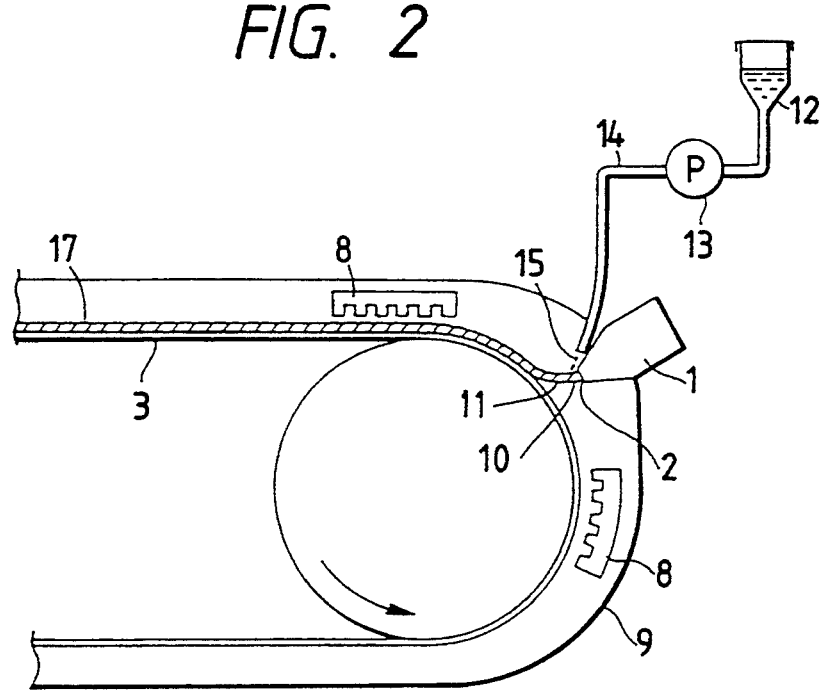
FIG. 2 is a side view of the apparatus of FIG. 1.
Figure 3:
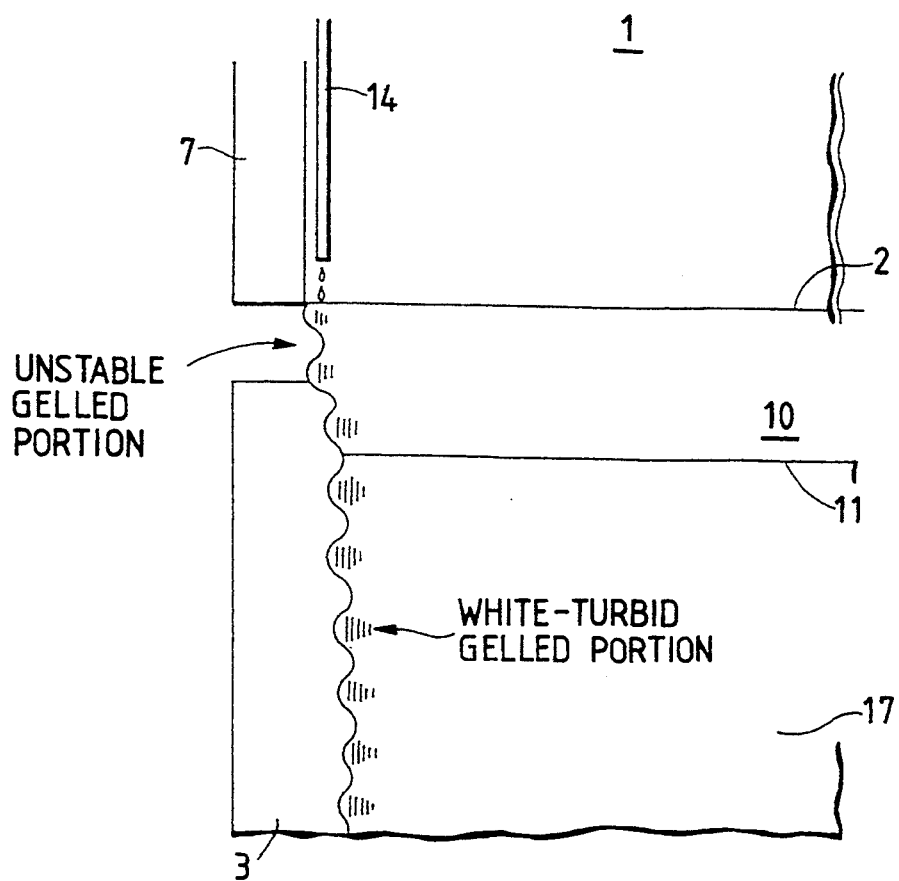
FIG. 3 is a perspective view showing edge portions of a formed film when the ratio of a poor solvent in a dropping liquid is not smaller than 90% by weight.
Figure 4:
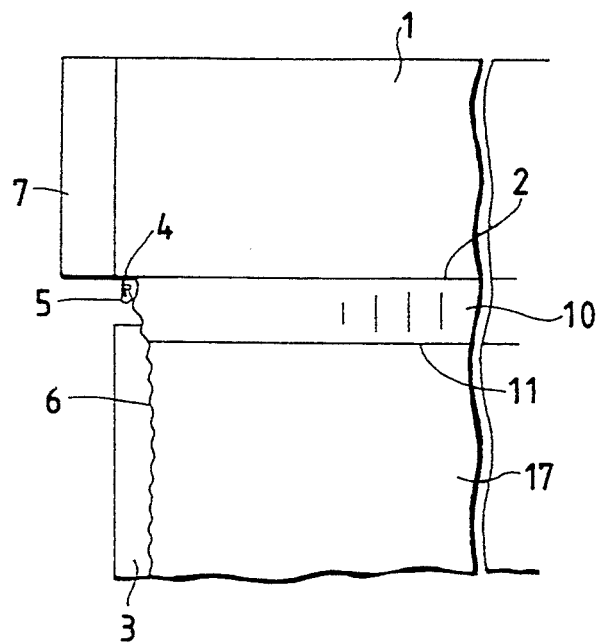
FIG. 4 is a partial perspective view for explaining a film-forming state in an example of a conventional film producing method.

A film-forming solution containing cellulose triacetate in an amount of 20% by weight as a solute and a solvent mixture of methylene chloride and methanol mixed in a weight ratio of 92:8 was made to flow in the manner illustrated in FIGS. 1 and 2 so that a base film was formed which had a thickness of 122 μm after drying. A liquid 15 to be dropped was filled in a tank 12 and from the tank 12 supplied by a pump 13 through a liquid feed pipe 14. The liquid was dropped within the hatched area 16 in FIG. 1, that is, in a range defined by a distance b=20 mm from the boundary of the die body 1 and a side plate 7 toward the inside of the slot and a distance a=10 mm from the slot blade lip portion to the blade outer wall portion. At portions before and after the flow portion, the solvent gas concentration is kept constant by means of labyrinth seals 8. Reference numeral 9 designates an enclosure.

The flow rate of the dropping liquid was selected to be 1 to 2 cc/min at each side.

The conditions of the dropping liquid were as follows:

Comparative Example 1

In the case where the dropping liquid composition contained methylene chloride in an amount of 100% by weight and the dropping flow rate was 1 cc/min, there was obtained a sufficient effect of preventing the generation of slugging. However, problems in separating the film from the support occurred at end portions where the liquid was dropped. Accordingly, it was necessary to clean the support about every two hours, thus resulting in a loss of production efficiency.

Inventive Example 1

In the case where the dropping liquid composition contained methanol in an amount of 30% by weight relative to methylene chloride and the dropping flow rate was 1 cc/min, there was obtained a sufficient effect of preventing the generation of slugging. Some problems were encountered in separating the film from the support, although the problems were significantly less severe than in the case of Comparative Example 1. Specifically, the support needed to be cleaned only about every 10 days, which allowed for an acceptable level of production efficiency.

Inventive Example 2

In the case where the dropping liquid composition contained methanol in an amount of 40% by weight relative to methylene chloride and the dropping flow rate was 1 cc/min, there was obtained a sufficient effect of preventing the generation of slugging. There was very little problem in separating the film from the support, and production could be continued for a month without the need for cleaning the support, so that the production efficiency was improved.

Inventive Example 3

In the case where the dropping liquid composition contained methanol in an amount of 60% by weight relative to methylene chloride and the dropping flow rate was 2 cc/min, there was a sufficient effect of preventing the generation of slugging. The amount of film material left on the support following separation of the film from the support was further reduced in comparison with Inventive Example 2. No problems were encountered even after continuous production for a month, whereby the production efficiency was further improved.

Comparative Example 2

In the case where the dropping liquid composition contained methanol in an amount of 95% by weight relative to methylene chloride and the dropping flow rate was 2 cc/min, the end portions of the film where the dropping liquid was dropped were gelled (having a white-turbid appearance) in such a manner that the formed film portion became very unstable. Production could not be continued.

As described above, in the solution-film producing method according the present invention, film formation can be performed with improved production efficiency while preventing the generation of slugging, without adversely affecting the formed film, without problems in separating the film from the support due to insufficient drying, and without requiring periodic cleaning of the support or reducing the film-forming speed.

What is claimed is:

1. In a method for producing a film by extruding a solution through the slot of an extrusion die onto a support while dropping a liquid onto opposite edge portions of a flow of a film-forming solution emerging from said slot to prevent slugging of said film-forming solution, the improvement wherein said dropped liquid contains a poor solvent and a good solvent for a film-forming solute contained in said film-forming solution, said poor solvent being present in an amount in a range of 30% to 90% by weight relative to said good solvent, said film-forming solution being prepared by dissolving a cellulose ester, to which is added a small quantity of plasticizer, in an organic solvent containing methylene chloride as a main component, said good solvent being methylene chloride, and said poor solvent being selected from the group consisting of methanol, butanol, and acetone wherein said dropped liquid improves production efficiency by not requiring periodic cleaning of the support.

2. The film producing method of claim 1, wherein said poor solvent is present in an amount in a range of from 40% to 90% by weight relative to said good solvent.

3. The film producing method of claim 1, wherein said poor solvent is present in an amount in a range of from 60% to 90% by weight relative to said good solvent.

4. The film forming method of claim 1, wherein said dropped liquid is dropped at a position in a range defined by a distance b=20 mm from a boundary of a die body of said extrusion die toward an inside of said slot and a distance a=10 mm from a slot blade lip portion of said extrusion die to a blade outer wall portion of said extrusion die.

5. The film producing method of claim 1, wherein a flow rate of said dropped liquid is in a range of from 1 to 2 cc/min at each side of said extrusion die.

6. The film producing method of claim 1, wherein said cellulose ester is cellulose triacetate.

7. The film producing method of claim 1, wherein said cellulose ester is cellulose diacetate.

* * * * *